Sept. 10, 1968  A. G. BARNES  3,401,228
FLIGHT SIMULATOR DISPLAY APPARATUS
Filed Aug. 26, 1963  5 Sheets-Sheet 1

Inventor
Arthur George Barnes
By
Stevens, Davis, Miller & Mosher
Attorneys

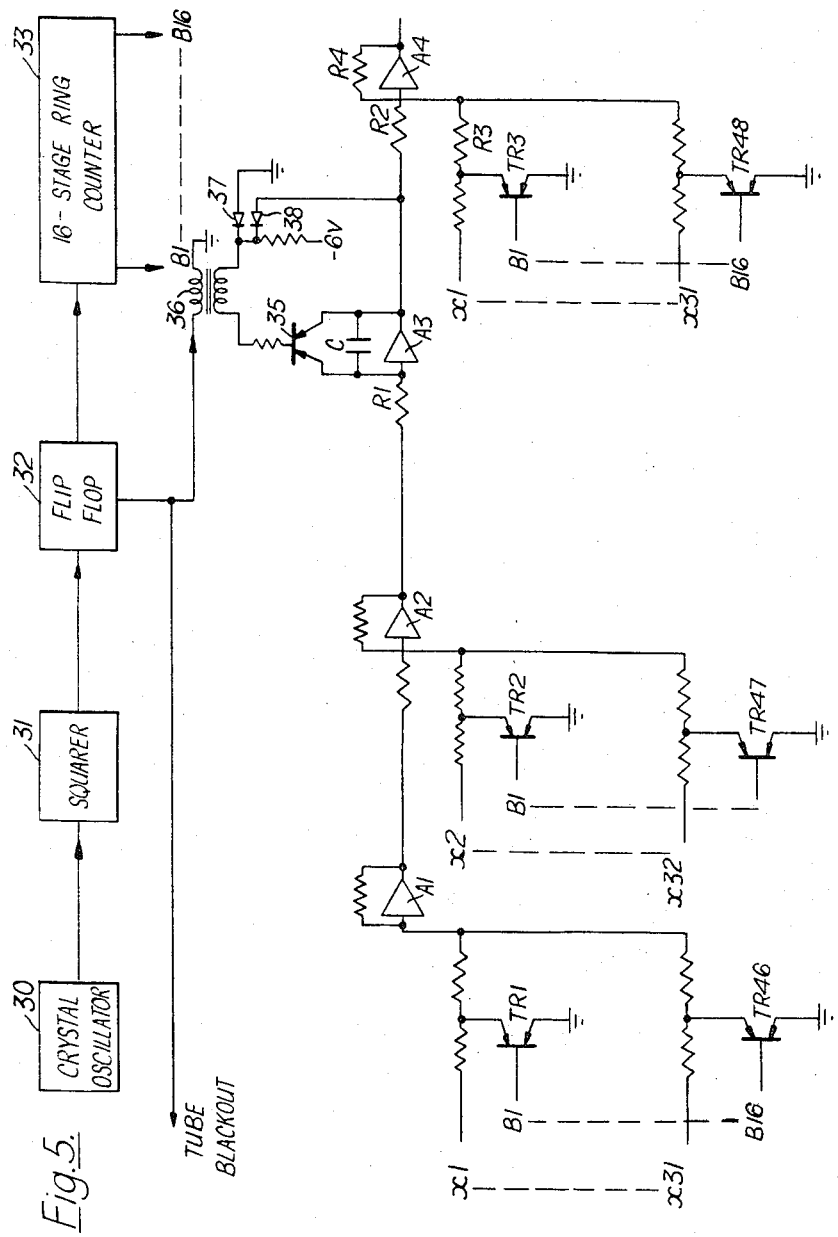

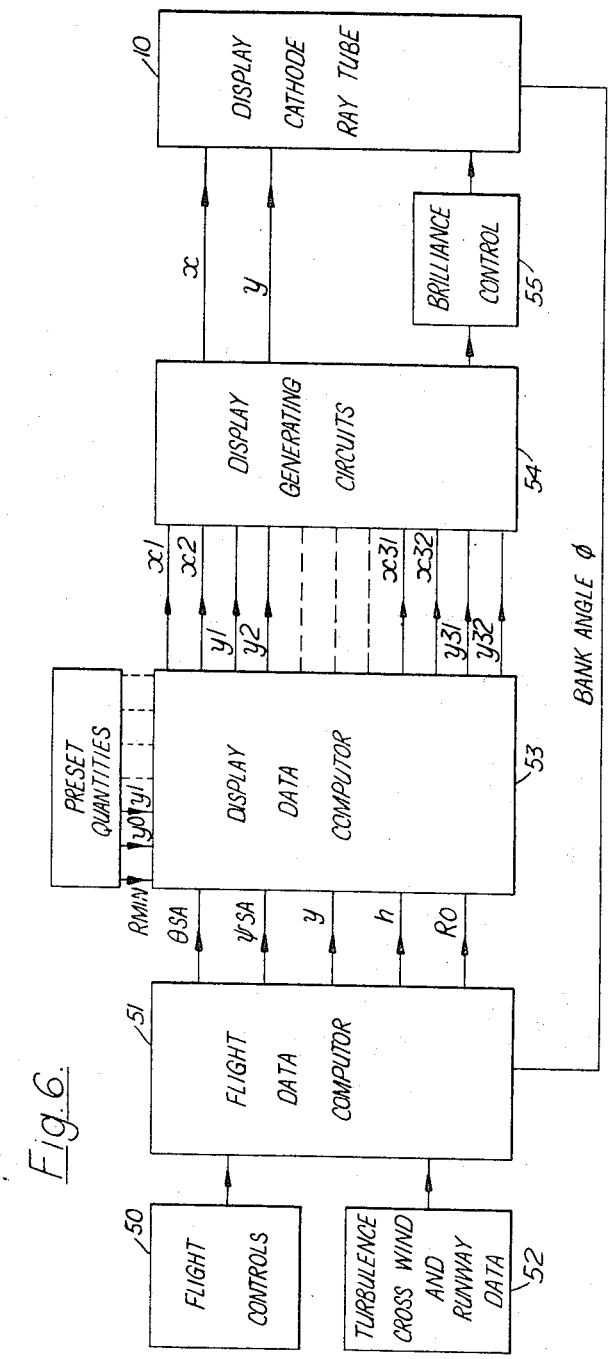

United States Patent Office 3,401,228
Patented Sept. 10, 1968

3,401,228
FLIGHT SIMULATOR DISPLAY APPARATUS
Arthur George Barnes, Lytham, England, assignor, by mesne assignments, to British Aircraft Corporation (Operating) Limited, a British company
Filed Aug. 26, 1963, Ser. No. 304,549
Claims priority, application Great Britain, Aug. 30, 1962, 33,364/62
10 Claims. (Cl. 35—10.2)

This invention relates to simulated visual displays for use in a grounded flight simulator or in an airborne craft. It has been proposed to use closed circuit television operating with a model of the terrain over which the craft is assumed to be passing to provide in a flight simulator an image which varies with the computed changes in position and attitude of the craft. However, such models are rather expensive and their use is therefore somewhat limited.

According to the present invention, each of a number of deflection-control circuits for deflecting a light spot over a display screen is responsive to input data in co-ordinate form and controls the visual display to provide on the latter a straight line or curve defined by the characteristics of the circuit and the input data, the combination of lines or curves representing in the visual display one or more objects or patterns external to the craft, and means responsive to the movement or simulated movement of the craft relative to the object or objects vary the input data applied to the deflection-control circuits so as to modify the directions, lengths or shapes of the lines or curves on the display in a manner representing the modification of the appearance of objects or patterns external to an aircraft which would be observed by a pilot undergoing real movement in relation to the objects or patterns. The visual display can be reduced to a minimum necessary to supply the pilot with the essential information, for example to straight lines defining the sides and the beginning and the end of the runway, the horizon and possibly a few additional bars representing given distances from the horizon. The deflection-control circuit can be provided with voltages representing at any instant the Cartesian co-ordinates of the two ends of these lines and the lines may then be generated successively on the face of a cathode ray tube by a time-sharing technique. The display may be extended to include circles and ellipses, in which case the input variables define the major and minor axes. It will be seen that this technique of building up a visual display on the basis of input variables representing co-ordinates provides considerable flexibility.

In order that the invention may be better understood, an example will now be described with reference to FIGURES 1 to 5 of the drawings accompanying the provisional specification, and FIGURE 6 accompanying this specification, in which:

FIGURE 5 shows a circuit diagram of a switching apparatus for applying the co-ordinates in turn to a cathode ray tube; and FIGURE 6 shows a block diagram of the complete apparatus.

Figure 1:
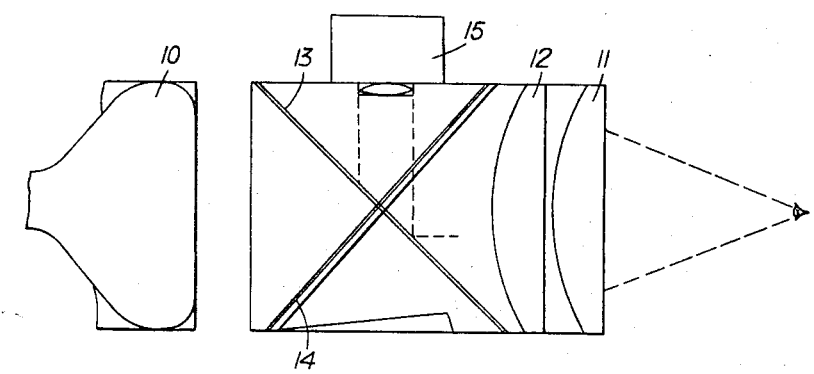
FIGURE 1 shows an optical system which enables the pilot to see the visual display to advantage in a flight simulator.

In FIGURE 1 the pilot views the front of the cathode ray tube 10 through an optical collimating system including two water-filled lenses 11 and 12 and a semi-reflecting surface 13. A simulated windscreen frame 14 is also placed in the optical path so that the image of this screen appears in the position of the true windscreen frame. This gives the display a sense of depth, the collimating system enabling the pilot to look "behind" the windscreen frame.

The semi-reflecting surface 13 enables a display provided by a display unit 15 to be superimposed on the display on the face of the cathode ray tube 10. The display unit 15 may include a further cathode ray tube on which additional information may be presented.

When a pilot is landing an aircraft he receives the information which he requires from the surrounding countryside and from a cross-bar lighting system or similar aid provided in the neighbourhood of the runway. FIGURES 2a to 2d show a simple display which provides the pilot with this kind of information using only eight lines. These four diagrams represent the appearance of a runway of normal dimensions when viewed from various ranges along a 3° glide path. In the diagrams the two lines 16 and 17 perpendicular to the ideal approach path represent lines of equal length (600 feet) on the ground, separated by a distance of 1800 feet, so that height information (deduced from perspective) may be obtained at long ranges from the runway. Figures 2a, 2b, 2c and 2d represent the appearance of this combination of lines from heights of 450 feet, 300 feet, 150 feet and 50 feet, at ranges of 8,600 feet, 5,730 feet, 2,860 feet and 955 feet, respectively, during a typical approach. The track errors for these four diagrams were 800 feet, 400 feet, 100 feet and 25 feet, respectively. The ideal ground track is represented by the line 18, the runway is shown at 19 and an infinite horizon is represented by the line 20.

Figure 3:
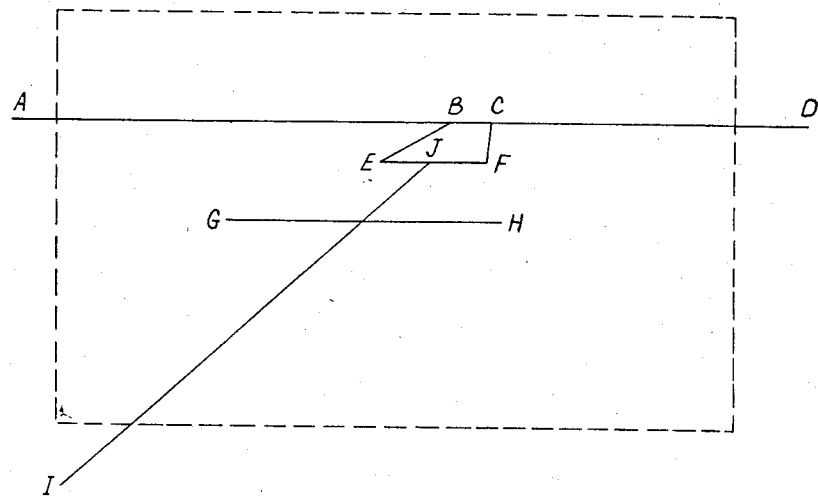
FIGURE 3 shows typically the co-ordinates which must be defined to produce a visual display shown in the diagrams of FIGURES 2a, 2b, 2c and 2d.
Figure 2A:
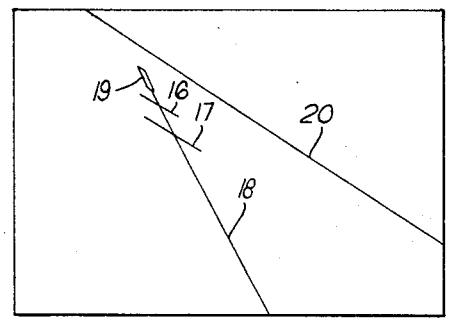
FIGURES 2a, 2b, 2c and 2d show the successive appearances of the visual display during a simulated landing.
Figure 2B:
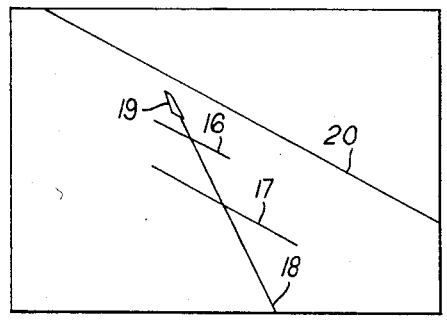
Figure 2C:
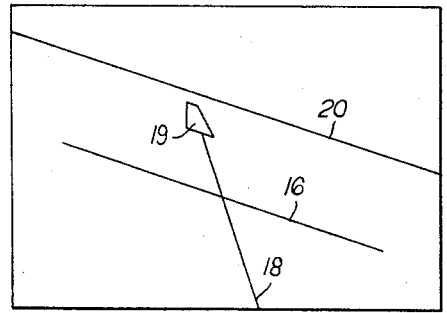
Figure 2D:
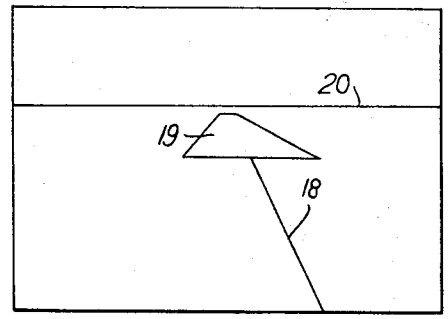
Figure 4A:
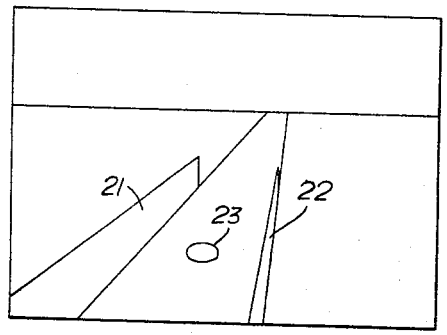
FIGURES 4a, 4b, 4c and 4d illustrate the successive appearances of a display which can be used for aircraft capable of vertical take-off and landing.
Figure 4B:
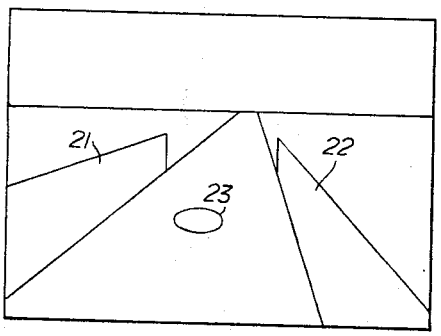
Figure 4C:
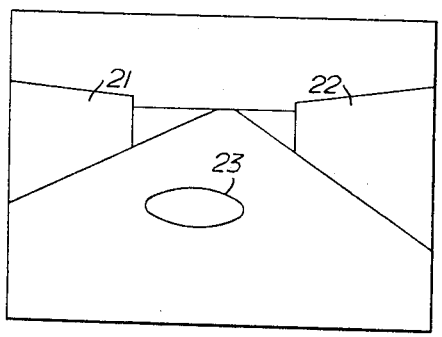
Figure 4D:
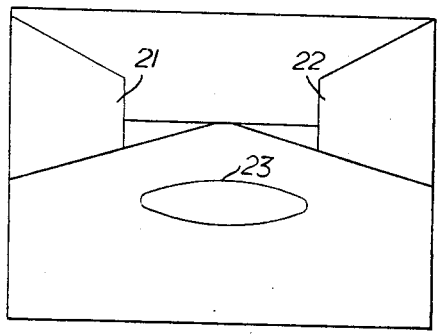

In practice the pilot does not usually see an infinite horizon and therefore it is possible to simplify the computation necessary to produce the approach display if the horizon is considered at a fixed range ahead of the aircraft, for example 5 miles. In addition the far end of the runway may also be tied to this range for the sake of simplicity. This is acceptable because the far end of the runway is not of interest to the pilot during the approach. A display with a finite horizon of this kind is shown in FIGURE 3. FIGURE 3 also shows references A to I representing the co-ordinates which must be fed to the cathode ray tube function-generating circuits in order to produce these lines. Each co-ordinate represents a first order approximation to the angle subtended at the pilot's eye by some ground feature relative to the longitudinal axis of the aircraft. The equations necessary to arrive at these co-ordinates are given below. In these equations, $h$ represents the altitude of the aircraft and $h_0$ the height of the pilot's eye above the ground when $h=0$; $y$ is the track error (i.e. the perpendicular distance of the craft from the ideal approach line IJ) and $y_0$ half the runway width; $\theta_{SA}$ the angle of pitch of the aircraft, $\psi_{SA}$ the angle of yaw, and $R_H$, $R_0$ and $R_1$ represent the range from the aircraft of the horizon, the runway threshold and the transverse bar GH, respectively. The width represented by the transverse bar GH is $2y$.

| Point | X co-ordinate | Y co-ordinate |
|---|---|---|
| A | $-x_{MAX}$ | $\frac{h+h_0}{R_H}+\theta_{SA}$ |
| B | $\frac{y+y_0}{R_H}+\psi_{SA}$ | $\frac{h+h_0}{R_H}+\theta_{SA}$ |

| Point | X co-ordinate | Y co-ordinate |
|---|---|---|
| C | $\dfrac{y-y_o}{R_H}+\psi_{SA}$ | $\dfrac{h+h_o}{R_H}+\theta_{SA}$ |
| D | $+x_{MAX}$ | $\dfrac{h+h_o}{R_H}+\theta_{SA}$ |
| E | $\dfrac{y+y_o}{R_o}+\psi_{SA}$ | $\dfrac{h+h_o}{R_o}+\theta_{SA}$ |
| F | $\dfrac{y-y_o}{R_o}+\psi_{SA}$ | $\dfrac{h+h_o}{R_o}+\theta_{SA}$ |
| G | $\dfrac{y+y_1}{R_1}+\psi_{SA}$ | $\dfrac{h+h_o}{R_1}+\theta_{SA}$ |
| H | $\dfrac{y-y_1}{R_1}+\psi_{SA}$ | $\dfrac{h+h_o}{R_1}+\theta_{SA}$ |
| I | $\dfrac{y}{R_{MIN}}+\psi_{SA}$ | $\dfrac{h+h_o}{R_{MIN}}+\theta_{SA}$ |
| J | $\dfrac{y}{R_o}+\psi_{SA}$ | $\dfrac{h+h_o}{R_o}+\theta_{SA}$ |

$R_{MIN}$, $R_H$ and $x_{MAX}$ are display constants and since $R_1=(R_o$—a constant distance), the variable inputs to the computer are height $h$, track error $y$, range from runway threshold $R_o$ and the two attitude references of elevation and azimuth related to the aircraft's longitudinal axis. Bank angle effects can be produced separately on the display cathode ray tube either by a sine-cosine resolver controlled by bank angle or by rotating the cathode ray tube deflection coil in proportion to bank angle. The effects of a crosswind may be simulated by an additional voltage added into the track error.

The problems associated with landing a V.T.O.L. aircraft are different from those associated with conventional aircraft and the information can advantageously be presented in a different manner. FIGURES 4a, 4b, 4c and 4d show successive images on the display during landing with one particular set of information lines. These include lines 21 and 22 which represent the tops of imaginary walls defining the sides of a runway and a circle 23 representing the landing area for the craft. The walls 21 and 22 enable the pilot to judge height more easily and therefore help to increase his control over the magnitude of his vertical velocity vector. The height of the side walls is preferably approximately the same as the height at which the pilot starts to check his rate of descent.

The co-ordinate voltages may be generated using standard computing circuits to evaluate the expressions given above. Division by the range quantity is required for several co-ordinates, and this may be accomplished by known techniques with a ganged servo-multiplier, used as feedback device.

The co-ordinate voltages may be applied in turn to the cathode ray tube by means of a ring switching device. FIGURE 5 shows a circuit diagram in which a 16-stage ring counter 33 is operated by pulses derived from a crystal oscillator 30, the output of which passes through a squaring unit 31 and a flip-flop 32. Pulses derived from each of the 16 output conductors B1 to B16 of the counter 33 are applied in turn to transistor circuits by means of which simultaneous $x$ and $y$ co-ordinate voltages are applied to the cathode ray tube. Only the circuits relating to the $x$ co-ordinate voltages are shown in FIGURE 5, the circuits for the $y$ co-ordinate voltages being exactly the same. There are three transistors for each of the 16 $x$-co-ordinate voltages, the three transistors corresponding to the voltage B1 being shown as TR1, TR2 and TR3, and those corresponding to the voltage B16 being shown as TR46, TR47 and TR48. These transistors serve to switch the relevant $x$-co-ordinate voltages to amplifiers A1, A2 and A4 which are common to all the 16 lines. The amplifier A1 receives voltages corresponding to the first of the pair of $x$ terms which, together with the corresponding pair of $y$ terms, define a straight line to be drawn on the face of the cathode ray tube. The amplifier A2 receives voltages corresponding to the second of the pair of $x$ terms, together with the output of amplifier A1, the arrangement being such that the output of the amplifier A2 represents the difference $(x_2-x_1)$. This output thus represents the total extension in the $x$ direction of the line to be drawn on the cathode ray tube. The amplifier A3 is an integrating amplifier having a capacitor C connected across its input and output and a bi-directional transistor 35 the purpose of which is to discharge the capacitor at the end of each operation. The output of the amplifier A3 is thus a voltage which increases steadily to an amplitude representing the difference $(x_2-x_1)$. This is applied to the amplifier A4 which again receives a voltage representing the first term $x_1$ and therefore provides an output voltage which starts at a level $x_1$ and increases or decreases steadily to a level $x_2$. This voltage is applied to the $x$ deflection coil of the cathode ray tube. The application of the voltages $x_1$, $x_2$ . . . $x_{31}$, $x_{32}$ to the amplifiers is achieved by pulses from the counter 33. Considering the voltages $x_1$ and $x_2$, the corresponding transistors TR1, TR2 and TR3 are normally bottomed. When the output conductor B1 of the counter 33 applies an output potential to the bases of these three transistors they are cut off, allowing the voltages $x_1$ to be applied to amplifiers A1 and A4 and the voltage $x_2$ to be applied to amplifier A2.

At the end of each ramp period of the integrating amplifier A3 a pulse from the flip-flop is applied through the transformer 36 to the base of the switching transistor 35 which is rendered conducting and thereby discharges the capacitor C. In order to keep leakage currents small, it is desirable to limit the reverse base voltage of the switching transistor to as low a value as possible in the cut-off condition. This requirement is met by using a transformer-coupled switching signal as shown in FIGURE 5. A diode gate consisting of the two diodes 37 and 38 selects the more positive of its two inputs, which are connected to earth and integrator output and controls the D.C. level of the transformer secondary. This allows a small-amplitude switching waveform to be used yet ensures that the transistor is always cut off on positive pulses.

To understand the operation of this apparatus, consider the generation of a line between the voltage co-ordinates $x_1$, $y_1$ and $x_2$, $y_2$. If the integrator input is $(x_2-x_1)$ volts, then the ramp amplitude at the output of the amplifier is $$(x_2-x_1)\cdot\frac{T}{R_1C}\cdot\frac{R_4}{R_2}$$

volts,
where $T=$integrating interval, in seconds
$C=$integrating capacity, in farads
$R_1, R_2, R_3, R_4=$resistances, in ohms.

A change in co-ordinate $x_1$ of $\Delta x_1$ volts must leave the voltage at the end of the ramp unaffected.

The conditions for correct scaling are, therefore:

$$\Delta x_1\cdot\frac{T}{R_1C}\cdot\frac{R_4}{R_2}=\Delta x_1\cdot\frac{R_4}{R_3}$$

or $$R_1C=\frac{R_3}{R_2}\cdot T$$

An identical circuit produces the ramp for the $y$ deflection circuit. If the integrating periods are identical the required ramp will be drawn on the tube face.

The amplifier A3 should preferably have a bandwidth of about 250 kc./s. in order to avoid the appearance of disturbances at the start of a ramp voltage. In the example which is being described, the integration period is 1 millisecond, and the reset period has the same duration. If the system is capable of drawing sixteen independent lines, the line repetition rate is thus about 33 per second.

To avoid undue separation of points which should be superimposed at the ends of two lines which meet at a corner (the separation being due to aircraft movement between the times when these two lines are painted on the display screen), it is desirable that the lines should not be painted in quick succession and then repainted after a long interval but should be distributed evenly throughout the time cycle.

The pulses controlling the brightening of the tube trace when a line is to be drawn are provided by the flip-flop 32.

FIGURE 6 shows in block form the apparatus which results when the invention is used in a flight simulator. The operation of the flight controls 50 causes variation of output voltages representing the positions of these controls and these voltages are fed into the flight data analogue computer 51 which also receives voltages representing wind speed and direction from the control unit 52 in the instructor's control desk. The computer 51 uses standard analogue computing techniques responsive to conventional input data signals from flight controls 50 and control unit 52 to provide information regarding the height of the aircraft, its range and track error and the angles made by the aircraft axes with a set of reference axes. This information is fed to the display data computer 53 for each of the pairs of co-ordinates. The computer 53 is a standard analogue computer responsive to conventional input data signals from computer 51 and which operates to solve the equations given in connection with FIGURE 3, or a set of equations designed to provide a comparably different display. Both these computers 51 and 53 rely only on circuits generating common arithmetical and trignonometric functions. Such circuits are well known from prior art standard text books and prior art references similar to those references cited of record herein. From the computer 53, the $x$ and $y$ voltages are applied to the display generating circuits 54, which have been described in connection with FIGURE 5. The $x$ and $y$ deflection signals provided by the circuits 54 are applied to the deflection electrodes of the display tube 10. The grid of the tube 10 receives a driving voltage from a brightness control circuit 55 which is intended to ensure that all lines are drawn with equal brightness, in the example which is being described. As all lines are not drawn at the same rate, without this control circuit the long lines would be less bright than the short ones. The circuit 55 receives from the deflection control circuits 54 for the period of the line-drawing operation a voltage roughly proportional to the length of the line. It has been found in practice that a voltage representing the quantity $|x_n - x_{n-1}| + |y_n - y_{n-1}|$ is a sufficiently good approximation and the two components of such a voltage may conveniently be derived from the outputs of the amplifiers A2 in the $x$ and $y$ deflection control circuits.

The displays illustrated in FIGURES 2 and 4 give the pilot situation information. The co-ordinate display system can also be used to present simultaneously command information, by means of the well-known dot and circle, or any other pair of distinctive symbols. The significance of certain lines or symbols may be emphasised by using different colours for different types of information: this is easily done using present-day colour television and optical-mechanical techniques.

To provide a wide field of view, the visual display unit may be a retractable unit which when in use is only about 6 to 9 inches from the pilot's eyes. This large field of view may accommodate the situation information (e.g. a runway approach display) together with command information (e.g. aiming mark and steering references) and numerical data (e.g. height, speed or engine conditions).

To provide a V.T.O.L. aircraft with all-weather capability for take-off, transition, and landing, the following display might be used. In addition to the situation display of FIGURE 4, the co-ordinate system produces a command display, consisting of three symbols: a fixed aiming circle, a moving target dot, with roll bar, and a moving "horizon bar." The vertical error between the aiming circle and target dot is a height demand (with suitable stabilising terms) zeroed by throttle movements controlling lift. The error between horizon bar and aiming circle is an attitude demand, zeroed by fore and aft stick movement. Lateral track errors are seen as horizontal errors between aiming circle and target dot. If an autopilot is available to do this task, the pilot monitors the display to see that no malfunctions occur.

As stated previously, the computer and display can be built into a real aircraft to provide a pilot with a landing system suitable for any weather conditions. The existing air data computers can be extended to carry out the computations necessary to provide the co-ordinate system with the required information. This visual display system can be used as a complement to an automatic landing system and enables the pilot either to monitor the autopilot or to carry out the landing himself using the data that the autopilot would otherwise be using. The system could also be used in a space vehicle.

Various modifications may be introduced into the appearance of the visual display to provide special effects, for example by suitable pulsing of a modulating electrode the lines may be reproduced as dotted lines in simulation of runway lighting. In addition, by controlling the grid potential of the display tube in accordance with the range, the lines may be given varying brightness along their lengths in order to produce better perspective effects and simulation of variation of forward visibility. Certain areas may be shaded and symbols may be introduced into the display to provide the pilot with additional information. A cathode ray tube having more than one electron gun with independent control of the deflection axes can be used to take full advantage of these facilities.

I claim:

1. Apparatus for providing on the screen of a visual display means in a craft or simulated craft a representation of the appearance from the craft of an object external to the craft, comprising means for deflecting a light spot over said display screen, a number of deflection control circuits each of which is responsive to input data in co-ordinate form and controls said visual display means to provide on the latter a line defined by the characteristics of said deflection control circuit and the input data, the combination of lines representing on said visual display screen the outline of at least one object external to the craft, and means responsive to the movement of the craft relative to the objects which vary according to said movement the input data applied to said deflection-control circuits so as to modify the lines on the display in a manner representing the modification of the appearance of objects external to the craft which would be observed by a pilot undergoing real movement in relation to the objects.

2. Apparatus for providing on a visual display screen in a craft or simulated craft a representation of the appearance from the craft of an object external to the craft, comprising an electron discharge tube including a phosphor display screen and deflection means for deflecting an electron beam over said phosphor screen, means for generating voltages representing the Cartesian co-ordinates of points at the ends of a number of lines which together form a representation of the outline of the object in the display, deflection control circuits responsive to each pair of voltages representing the positional values in the direction of deflection of the two ends of a line to be drawn and generating deflection control waveforms representing a transition along the said line from one end point to the other, selector means for applying said control waveforms to said deflection means of said electron discharge tube one pair after another, each pair consisting of the control waveforms for the two mutually perpendicular deflections corresponding to a given line, whereby each line is traced in turn on said screen, means whereby the light spot is substantially blacked out between the end of one deflection control waveform and the beginning of another, and means responsive to the movement of the craft relative to the object to vary the input data applied to said co-ordinate voltage generating means so as to modify the lines on the display in a manner representing the modification of the appearance of objects external to the craft which would be observed by a pilot undergoing real movement in relation to the objects or patterns.

3. Apparatus according to claim 1, in which each deflection control circuit includes means computing the difference between the positional values in the direction of deflection values of the two ends of a line, an integrating circuit responsive to this difference to generate an electric ramp waveform representing the slope of a line extending between the two points and means adding the ramp waveform to the first of the two values to give the required deflection waveform.

4. Apparatus according to claim 3, including timing means defining a fixed time interval in which said ramp waveform is generated, means generating a signal representing approximately the length of the line defined by the two pairs of co-ordinate values and brilliance control means responsive to said signal and operating to prevent loss of brightness with increasing length of line.

5. Apparatus according to claim 1, including means computing the range from the craft of the portion of the line which is being traced by the light spot and brilliance control means responsive to said range and operating to decrease the brightness of the light spot with increasing range.

6. Apparatus according to claim 1, including a selector switch in the form of an electronic counter controlling the application of the deflection control waveforms in turn to said display means, and transistor switches operated by the output voltages from said electronic counter.

7. Apparatus according to claim 1, including a collimating lens system through which said display screen is viewed.

8. Apparatus according to claim 1, including means for generating additional signals representing command information and means for additionally displaying said command information in response to said signals.

9. Apparatus according to claim 8 including servo means responsive to said command information signals to reduce to zero any errors represented by said command information signals.

10. Apparatus according to claim 8, in which said command information is generated on a further display means and is superimposed on said original display means by means of an optical system.

References Cited
UNITED STATES PATENTS 2,988,821 6/1961 Bolie _____ 235—150.22
3,060,596 10/1962 Tucker et al. _____ 235—150.22

MALCOLM A. MORRISON, *Primary Examiner.*

J. RUGGIERO, *Assistant Examiner.*